UNITED STATES PATENT OFFICE.

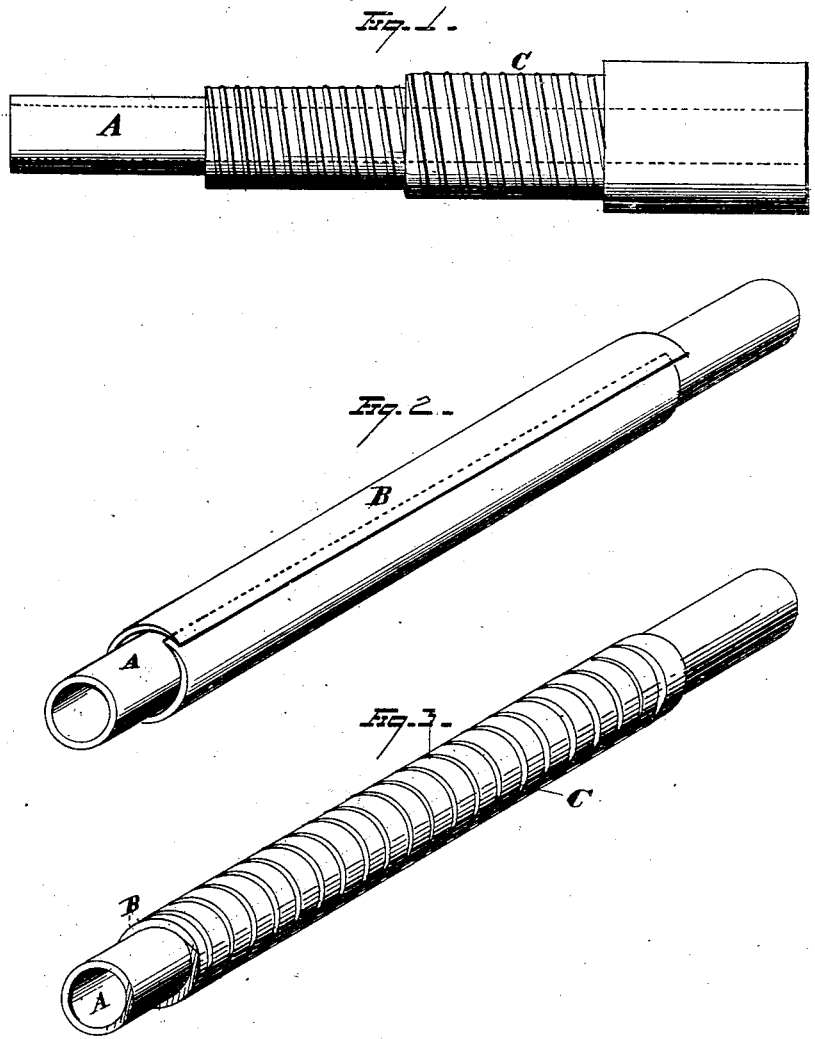

HENRY J. MERRENS, OF CLEVELAND, OHIO.

IMPROVEMENT IN RUBBER HOSE.

Specification forming part of Letters Patent No. 194,363, dated August 21, 1877; application filed June 9, 1877.

*To all whom it may concern:*

Be it known that I, HENRY J. MERRENS, of Cleveland, in the county of Cuyahoga and State of Ohio, have invented certain new and useful Improvements in Rubber Hose; and I do hereby declare the following to be a full, clear, and exact description of the invention, such as will enable others skilled in the art to which it pertains to make and use it, reference being had to the accompanying drawings, which form part of this specification.

My invention relates to rubber hose; and consists in the new and peculiar manner of its construction, as hereinafter fully specified and claimed.

In the drawing, Figure 1 represents a longitudinal section of hose embodying my invention. Fig. 2 is a perspective view, showing the manner in which the cloth, either saturated with rubber or not, is applied. Fig. 3 is a similar view, representing the cloth in position and secured with cord or wire.

The object of my invention is to make a stronger hose, that shall be less likely to become ruptured, and that can be manufactured at a cheaper price than hose of ordinary construction.

The inner portion A of the hose is of rubber, and formed on a mandrel in the usual well-known manner. Around this is wound a long piece of coarse cloth, B, either saturated or impregnated with rubber or not, somewhat wider than the circumference or distance around the inner portion A, so that one of its longitudinal edges may overlap the other to a greater or less extent, as may be found most effective and convenient. The cloth is preferably used with the warp running parallel with the length of the hose, as the cloth can be used in greater length, as well as for other obvious reasons.

When the cloth has been applied in the proper manner, with its edges overlapping each other, then I wind around the same cord, wire, or other similar article, C, which serves to retain the cloth in place, as well as to considerably strengthen the hose. According to the strength and size of the hose required, the operation of a layer of cloth and a winding of cord or wire may be repeated several times. After the last winding has been completed, if more than one layer is put on, a coating of rubber is applied to the same, and afterward vulcanized.

From the foregoing description it will be understood that my improvement lies in the specific construction of a hose made in all details as above set forth, and its merit is dependent upon the advantage thereon attendant. Thus, it is old to form an inner layer of rubber, draw a seamless tube over it, apply cement or a vulcanizing compound thereto, and then wrap with wire, twine, or thread, after which an outer tube can be formed about it.

But my invention consists in, and what I desire to secure by Letters Patent, is—

A rubber hose consisting of an interior cylinder of rubber and a layer or layers of cloth, the latter formed with longitudinal overlapping edges, as described, and wound with cord or wire, the whole being coated with vulcanized rubber, substantially as described.

In testimony whereof I have signed my name to this specification in the presence of two subscribing witnesses.

HENRY J. MERRENS.

Witnesses:
FRANCIS TOUMEY,
W. E. DONNELLY.